(12) United States Patent
Teeters

(10) Patent No.: US 7,150,437 B1
(45) Date of Patent: Dec. 19, 2006

(54) CONDUIT SUPPORT ATTACHABLE TO A CEMENTITIOUS MATERIAL FORM

(76) Inventor: James D. Teeters, 408 Rosewood Ct., Roseville, CA (US) 95747

( * ) Notice: Subject to any disclaimer, the term of this patent is extended or adjusted under 35 U.S.C. 154(b) by 603 days.

(21) Appl. No.: 09/999,050

(22) Filed: Nov. 15, 2001

(51) Int. Cl.
*F16L 3/08* (2006.01)

(52) U.S. Cl. .......................... 248/70; 248/71; 248/74.1; 49/219.1

(58) Field of Classification Search .................. 248/49, 248/70, 71, 74.1, 74.3, 73, 300, 315, 316.1, 248/228.8, 230.8, 499, 505; 249/91, 93, 249/148, 149, 207, 219.1
See application file for complete search history.

(56) References Cited

U.S. PATENT DOCUMENTS

| | | | |
|---|---|---|---|
| 991,192 A | 5/1911 | Battenfeld | |
| 2,687,864 A * | 8/1954 | Kohler | 248/74.4 |
| 2,826,385 A | 3/1958 | Osborn | |
| 2,884,214 A | 4/1959 | Wrobel | |
| 3,149,808 A | 9/1964 | Weckesser | |
| 3,150,429 A * | 9/1964 | Shaffer | 249/207 |
| 3,568,455 A * | 3/1971 | McLaughlin et al. | 405/184.4 |
| 3,632,069 A * | 1/1972 | Thayer et al. | 248/56 |
| 3,632,070 A * | 1/1972 | Thayer | 248/68.1 |
| 3,632,071 A * | 1/1972 | Cameron et al. | 248/74.3 |
| 3,690,609 A * | 9/1972 | Montesdioca | 248/68.1 |
| 3,771,751 A * | 11/1973 | Derivaz | 248/74.3 |
| 4,033,534 A | 7/1977 | Bergkvist | |
| 4,728,071 A | 3/1988 | Salacuse | |
| 4,805,856 A | 2/1989 | Nicoli | |
| 4,899,963 A * | 2/1990 | Murphy | 248/65 |
| 4,993,670 A * | 2/1991 | Tesar | 248/68.1 |
| 5,040,751 A * | 8/1991 | Holub | 248/62 |
| 5,042,958 A | 8/1991 | Stenersen | |
| 5,060,891 A * | 10/1991 | Nagy et al. | 248/56 |
| 5,125,619 A * | 6/1992 | Collins | 249/219.1 |
| D330,504 S * | 10/1992 | Collins | D8/354 |
| 5,190,260 A | 3/1993 | Daubenspeck | |
| 5,222,701 A * | 6/1993 | Rowland | 248/74.3 |
| 5,632,457 A * | 5/1997 | Neely, Jr. | 248/69 |
| D379,584 S * | 6/1997 | Lindquist | D8/380 |
| 5,746,401 A * | 5/1998 | Condon | 248/62 |
| 6,672,029 B1 * | 1/2004 | Tucker | 52/745.21 |

FOREIGN PATENT DOCUMENTS

| | | | |
|---|---|---|---|
| CH | 650322 A | * | 7/1985 |
| EP | 451459 A2 | * | 10/1991 |

* cited by examiner

*Primary Examiner*—Anita M. King
(74) *Attorney, Agent, or Firm*—Heisler & Associates

(57) ABSTRACT

A conduit support is provided formed of a back plate and a top plate attached at right angles to each other. The two plates are removably fastenable to a top edge of a form in which cementitious material is to be poured, and in which a conduit is to be encased or extend vertically out. A flexible strap attached to the top plate extends away from the top plate to wrap around the conduit surface. The free end of the strap is then routed through a clasp to the top plate, maintaining tension in the strap and holding the conduit rigidly against an edge of the top plate while the cementitious material is poured and hardens. The strap is preferably flexible plastic having an integral clasp at one end of the strap. After the poured material hardens, the strap may be removed, and the support removed from the form for reuse.

12 Claims, 2 Drawing Sheets

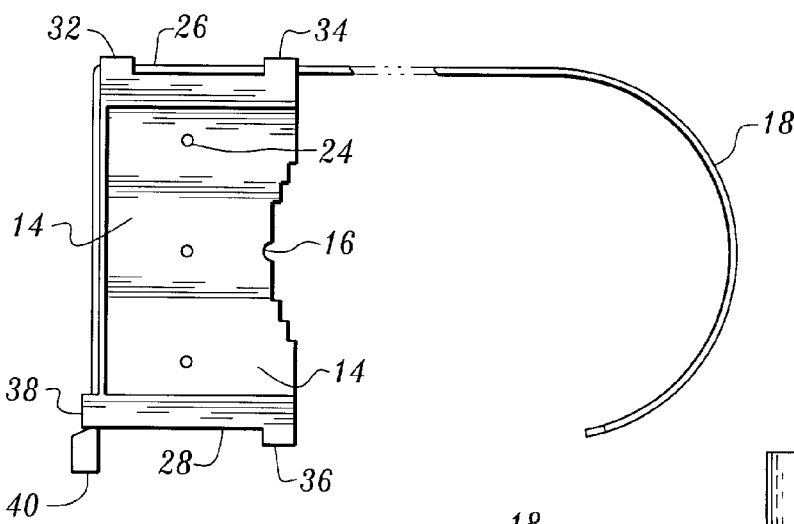
Fig. 2
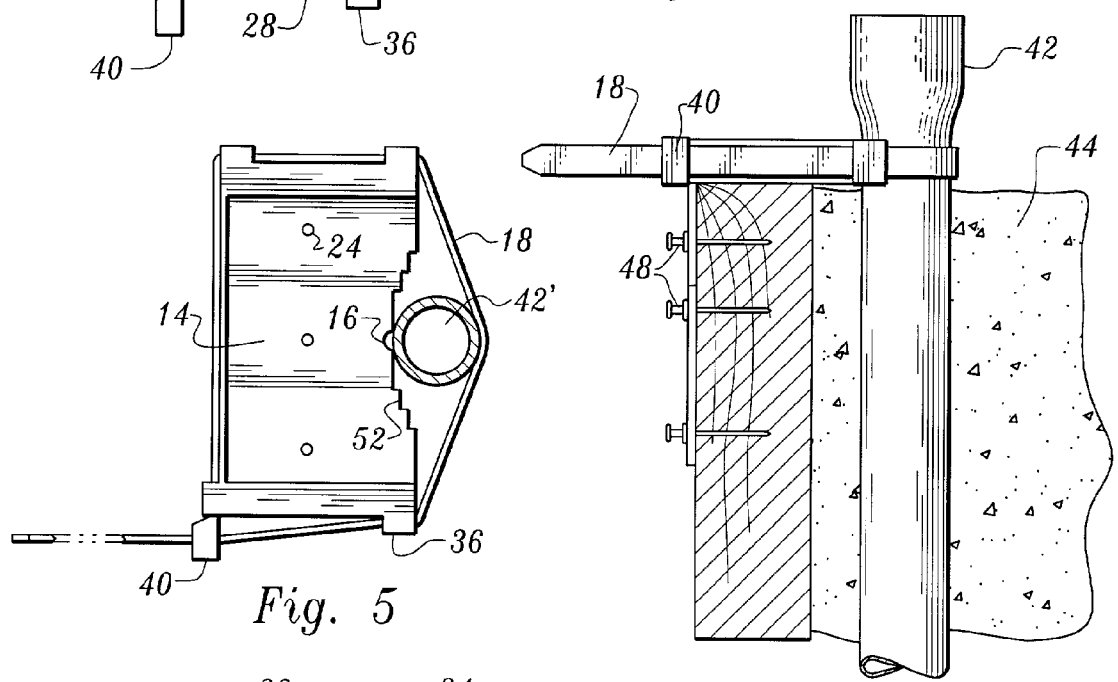
Fig. 5
Fig. 4
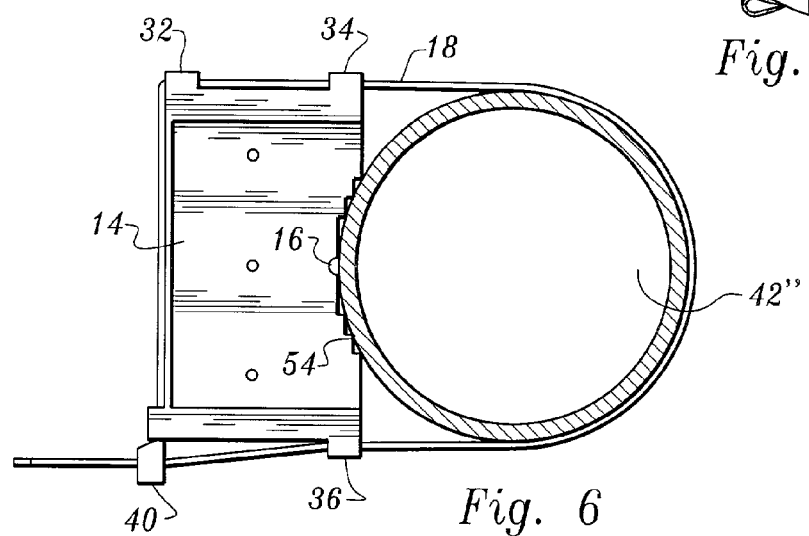
Fig. 6

CONDUIT SUPPORT ATTACHABLE TO A CEMENTITIOUS MATERIAL FORM

FIELD OF THE INVENTION

This invention relates to building construction, and in particular to the support of a vertically oriented conduit within a concrete slab or other horizontal cementitious surface during building fabrication.

BACKGROUND OF THE INVENTION

The necessity for the stable support of a conduit during fabrication of building structures has long been recognized, and this ongoing need has been addressed in the patent art. One group of patents relate to clamping devices that secure the conduit along the face of a wall or other structural surface, and the clamps are designed to remain exposed and accessible after construction is complete. Among these patents is U.S. Pat. No. 991,192 dating back to 1910, as well as later U.S. Pat. Nos. 2,826,385, 2,884,214 and 3,149,808.

A construction requirement exists where the conduit becomes fully covered and embedded in the fabricated structure's material (i.e. a concrete foundation) by the construction process. U.S. Pat. No. 4,033,534 discloses a clamping apparatus for rigidly holding sewer pipes in a trench, where the pipe, as well as its support, are completely surrounded when the trench is backfilled with sand, gravel or comparable materials. U.S. Pat. No. 4,033,534 discloses a pipe support mounted on a structure's foundation where the casting material then embeds both the pipe and the pipe support into the finished structure. It will be noted that these patents solely disclose horizontal runs, and that the support mechanism becomes completely captive in the construction process, so that no part of the support apparatus is retrievable after being covered by the added material. Accordingly, the entire conduit support device is expendable, and its use involves unrecoverable material costs.

SUMMARY OF THE INVENTION

Unlike the prior art, the present invention discloses an inexpensive conduit support that may be used with either horizontal or vertical runs, and that maintains the conduit in a secure position in a poured wall or foundation while cementitious slurry mix, such as liquid cement, is poured and sets up. A form, usually made of wood, provides a structural mold delineating the wall or the foundation being fabricated, and the cementitious slurry is poured to fill the mold. A conduit to be encapsulated in the structure is positioned in the mold with at least one end extending beyond a top of the form so that a service connection to the conduit is later externally accessible.

The invention is configured as a top plate and a back plate joined together at right angles and having fastener holes passing through the plates. In the vicinity of the top of the form where the conduit end extends out of the mold, the back plate of the invention is placed in facial contact with a board surface of the form, with the top plate in contact with the form edge and extending over the mold cavity. In a preferred embodiment, both the top plate and the back plate are temporarily, but firmly, secured to the form board by removable fasteners, such as double headed nails.

The top plate edge has an arcuate contour shaped to provide intimate contact with conduits of different diameters, and the extending conduit fits snugly against the arcuate edge of the top plate. One end of an elongate flexible strap has a clasp, the other end has a tip which can be fed into and secured to the clasp. The strap extends from one side of the top plate, wraps around the conduit and holds it against the arcuate contour of the top plate, and locks into the clasp. Loops in the top plate hold the strap adjacent the top plate. The conduit is now tightly held in position, and remains so as it becomes enveloped by the flowing cementitious material.

After the material sets, the major components of the support, i.e. the top and back plates, are retrievable by removing the fasteners and are reusable. Only the inexpensive strap, which may be removed by cutting, is expended in use of the support. If the clasp is releasable, the strap can also be reused along with the remainder of the conduit support.

OBJECTS OF THE INVENTION

Accordingly, a primary object of the present invention is to provide support for holding a conduit extending vertically up through a surface of hardening cementitious material.

Another object of the present invention is to provide a conduit support which is removably attachable to a form board adjacent the cementitious material.

Another object of the present invention is to provide a conduit support which can be removed from the conduit and the form board after use and for reuse in later construction operations.

Another object of the present invention is to provide a conduit support which is configured to hold conduits having a variety of different diameters, shapes and sizes extending up through a top surface of hardening cementitious material.

Another object of the present invention is to provide a conduit support which is easy to attach and detach to a form board and easy to attach to and detach from a conduit.

Another object of the present invention is to provide a conduit support which is formed of low cost materials and is sturdy and lightweight in construction for cost minimization and ease of use and reuse.

Other further objects of the present invention will become apparent from a careful reading of the included drawing figures, the claims and detailed description of the invention.

BRIEF DESCRIPTION OF THE DRAWINGS

FIG. 2 is a top plan view of that which is shown in FIG. 1.

FIG. 4 is a side elevation view of that which is shown in FIG. 3 showing the use of the invention in support of a conduit.

FIG. 5 is a top plan view of that which is shown in FIG. 3 showing the invention used with a relatively small diameter conduit.

FIG. 6 is a top plan view similar to FIG. 5 but showing the invention used with a relatively large diameter conduit.

DESCRIPTION OF THE PREFERRED EMBODIMENT

Figure 1:
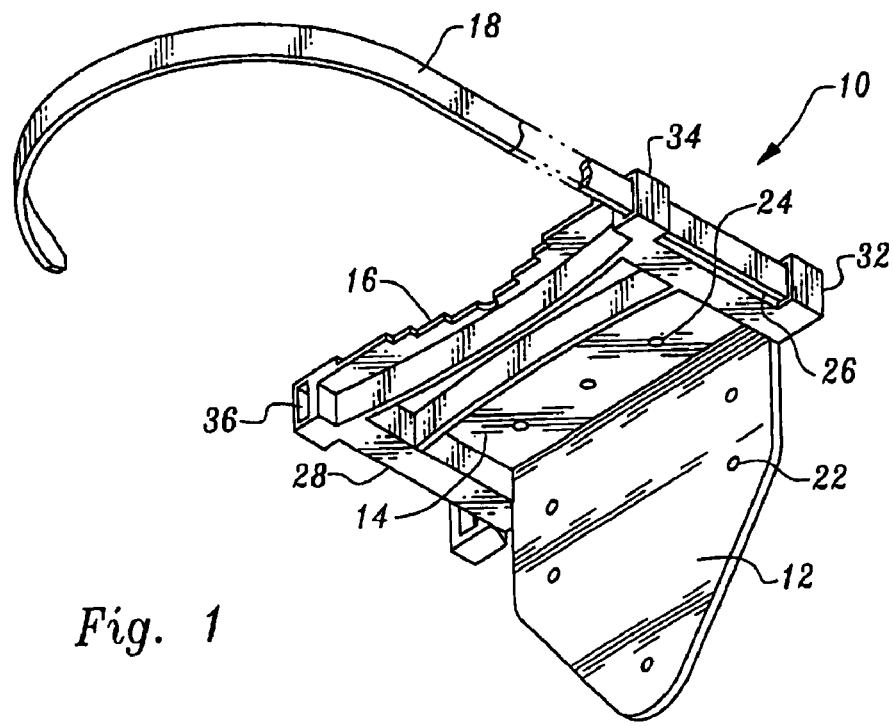
FIG. 1 is a perspective view of the conduit support of this invention with the strap free of the clasp.

Referring now to the drawings, wherein like reference numerals represent like parts throughout the various drawings, FIG. 1 shows the conduit support 10 of a preferred embodiment of this invention. The conduit support 10 is configured to hold a conduit 42 extending up through a top surface of hardening cementitious material 44 (FIG. 3).

In essence, and with particular reference to FIGS. 1 and 2, the basic details of the conduit support 10 are described. The conduit support 10 is generally formed from two plates including a back plate 12 and a top plate 14. The plates 12, 14 are preferably perpendicular to each other. The top plate 14 supports a strap 18 through a series of passageways 32, 34, 36 which act as loops through which the strap 18 can be fed. The strap 18 is generally configured preferably as a "ZIP-TY" with a clasp 40 capable of holding the strap 18 passing therethrough. Hence, when the strap 18 is fed through the passageways 32, 34, 38 the strap 18 is secured to the top plate 14 and can surround and hold a conduit 42 adjacent a front face contour 16 of the top plate 14 while the cementitious material 44 hardens.

Figure 3:
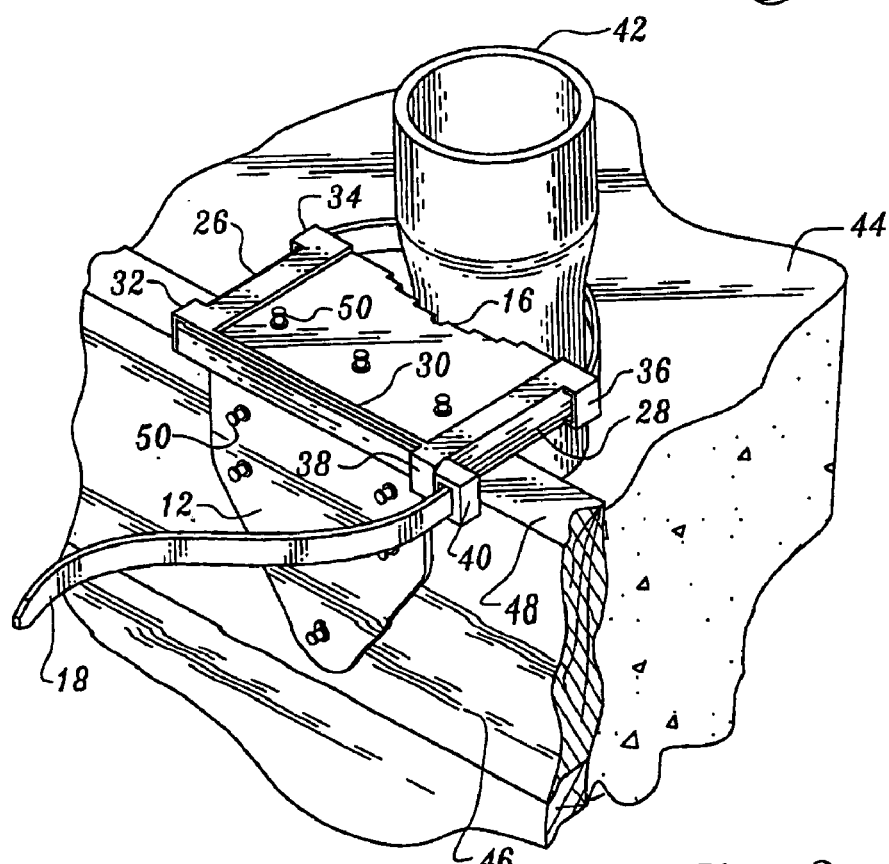
FIG. 3 is a perspective view of the conduit support of this invention shown supporting a conduit extending vertically up from a cementitious matrix.

With particular reference to FIGS. 1 through 3, details of the conduit support 10 of this invention are described. The conduit support 10 includes a back plate 12 rigidly attached at a right angle to a top plate 14. The back plate 12 and top plate 14 are preferably planar members, and may be made of wood, plastic, metal or other substantially rigid material. The plates 12, 14 could be skeletal in form, non-planar, or other irregular shape, provided that they can minimally perform the basic function of attaching in fixed position to the form board 46 and hold the conduit 42 adjacent the support 10. It is also conceivable that the back plate 12 could be omitted from the support 10 altogether.

Back plate 12 is provided with through holes, i.e. 22, and top plate 14 is provided with through holes, i.e. 24 which are dimensioned to clear the shafts of appropriately sized removable fasteners, such as screws or nails. Preferably, double headed nails are used. While a pattern of multiple holes 22, 24 are shown, other fasteners (i.e. adhesives, spring clips to grasp the form board 46, or clamps) could be used.

The front face contour 16 of the top plate 14 is preferably, but not necessarily arcuately shaped. The contour 16 preferably is gradually stepped as will be described in detail below. A flexible strap 18 is routed along the side edges 26, 28 of the top plate 14, and along the back edge 30 (FIG. 2) threading through the supporting passageways 32, 34, 36, 38 to a locking clasp. The strap 18 preferably encircles the top plate 14, looping on a side of a conduit 42 opposite a side of the conduit abutting the contour 16.

The path of the strap 18 encompassing the top plate 14 may be best seen in FIG. 2. In the preferred embodiment the strap 18 is a flexible "ZIP-TY" plastic strap having an integral locking clasp 40 at one end of the strap 18. "ZIP-TY" is a trademark of Zippertubing Company located in Los Angeles, Calif. Such straps 18 are flexible and feature ribs which engage a tooth inside the clasp 40 which is biased to allow entry of the strap 18 into the clasp 40 more easily than exit out of the clasp 40. The clasp 40 can include a release button which allows the strap 18 to be released.

The free end of the strap 18 threads through the passageways 38, 32, 34, looping in a curve forward of the front face contour 16 of the top plate 14 for entry into the passageway 36 and then into the locking clasp 40. The passageways 32, 34, 36, 38 are preferably fixed to the top plate 14 and not the strap 18. However, the strap 18 could be affixed to the passageways 38, 32, 34. Also, the clasp 40 could be separate from the strap and fixed in position relative to the top plate 14.

Referring to FIG. 3, a conduit 42 to be encased in a cementitious material 44 is shown secured in position by the support 10. A portion of the form's side board 46 has a top edge 48, and the support 10 is fastened to the side board 46 by double headed nails, e.g. 48, 50 which firmly secure the side plate 12 to the face of the board 46, and the top plate 14 to the edge 48. As few as one fastener 48, 50 could conceivably hold the support 10 in place.

The strap 18 wraps around the conduit 42, and completes its circuit of the top plate 14 by entrance into the passageway 36 and then the locking clasp 40. By cinching up on the strap 18 within the clasp 40, the conduit 42 is securely held against the contour 16 of the top plate 14 by the tension in the strap 18. Locking teeth of the clasp 40 block any loosening of the strap 18, and the strap 18 maintains firm contact between the conduit 42 and the support 10 as the cementitious material 44 is poured and as it sets up.

FIG. 4 illustrates that the support 10 provides support to the conduit 42 while allowing the circumferential surface of the conduit 42 to be completely surrounded by the cementitious material 44 when the form is filled. It will be appreciated that the cementitious material 44 can be the top of a vertical wall construction, or a top surface of a horizontally oriented slab of cementitious material 44.

The versatility of the arcuate contour 16 may be seen in FIGS. 5 and 6. The contour 16 is preferably symmetrically stepped relative to a central plane perpendicular to the front edge of the top plate 14. The steps, i.e. 52 provide areas of support for conduits of a range of diameters; the preferable range being from 1" to 4" diameter. FIG. 5 shows a smaller diameter conduit 42' in contact with the lowest step level of the contour 16. In FIG. 6 a larger diameter conduit 42" is supported over a larger portion of its outside circumference by the additional steps, i.e. 54 cut into the contour 16. (In the drawings, corresponding elements are designated by the same reference number, albeit that they are differentiated by primes.) Additionally, it will be appreciated that in the practice of the invention the same strap 18 can wrap the surface of a smaller conduit 42' (FIG. 5), as well as the surface of a larger conduit 42" (FIG. 6).

The word "conduit" has been employed in the specification for convenience of expression, but it will be realized that the term is meant to generically include all equivalent structures such as pipes, channels or similar ducting devices utilized in the construction industry.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A support apparatus for rigidly holding a conduit positioned within an interior region of a form, said form being a mold outlining the shape of a solid structural element to be fabricated from a fluid cementitious material poured into said form, said form having at least one planar surface and a top edge, said support apparatus comprising:

a planar back plate configured to abut the at least one planar surface of said form;

a planar top plate joined at a substantially right angle to said back plate, said top plate configured to abut said top edge of said form;

wherein said top plate has a front edge opposite said back plate, said front edge adapted to contact the conduit;

at least one of said plates adapted to be fastened to said form;

a flexible elongated strap fixed in position relative to said top plate and having a first end and a second free end adapted to be releasably coupled to one of said plates at multiple locations between said free end and said first end;

wherein said flexible elongate strap is formed as a separate mass of material from said top plate, such that said support apparatus is formed of at least two separate structures in the form of said top plate and said flexible elongate strap;

wherein a clasp is integrally formed with said flexible elongate strap, said clasp located at said first end of said flexible elongate strap;

wherein said top plate includes at least one supporting passageway, said supporting passageway sized to allow said free end of said flexible elongate strap to be routed therethrough;

wherein said front edge is at least partially arcuate in a concave fashion; and wherein said front edge is stepped.

2. The support apparatus of claim 1 wherein said back plate has at least one hole there through, whereby at least one fastener may be inserted through said at least one hole.

3. The support apparatus of claim 2 wherein said top plate has at least one hole therethrough, whereby at least one fastener may be inserted through said at least one hole.

4. The support apparatus of claim 1 wherein said at least partially arcuate portions of said front edge curve around an elongate conduit axis along which the conduit is adapted to be routed when the conduit is adjacent said front edge, said elongate conduit axis substantially perpendicular to said top plate.

5. A support for an elongate item extending up out of hardening cementitious material bounded by at least one form board, the support comprising in combination:

a top plate having a front edge adapted to abut the item;

a flexible elongate strap adapted to be held relative to said top plate, said flexible elongate strap having a first end and a second free end opposite said first end;

a fastener adapted to attach said top plate to a top edge of the form board in a position placing said front edge of said top plate extending over said hardening cementitious material;

wherein said flexible elongate strap is formed as a separate mass of material from said top plate, such that said support is formed of at least two separate structures in the form of said top plate and said flexible elongate strap;

wherein a clasp is integrally formed with said flexible elongate strap, said clasp located at said first end of said flexible elongate strap;

wherein said top plate includes at least one supporting passageway, said supporting passageway sized to allow said free end of said flexible elongate strap to be routed therethrough;

wherein said front edge is at least partially arcuate in a concave fashion; and wherein said top plate includes at least four of said supporting passageways spaced from each other and located at a perimeter of said top plate, said flexible elongate strap routed through said supporting passageways with said flexible elongate strap encircling a perimeter of said top plate.

6. The support of claim 5 wherein said fastener includes at least one nail.

7. The support apparatus of claim 5 wherein said at least partially arcuate portions of said front edge curve around an elongate conduit axis along which the conduit is adapted to be routed when the conduit is adjacent said front edge, said elongate conduit axis substantially perpendicular to said top plate.

8. A method for holding an elongate item in a substantially vertical orientation extending up out of hardening cementitious material bounded by at least one form board, the method including the steps of:

providing a support including a top plate having a front edge adapted to abut the item; a flexible elongate strap adapted to be held relative to the top plate, having a first end and a second free end opposite the first end; a fastener adapted to attach the top plate to a top edge of the form board in a position placing the front edge of the top plate extending over the hardening cementitious material;

fastening the top plate to the top edge of the form board with the front edge of the top plate extending over the hardening cementitious material;

placing the elongate item adjacent the front edge of the top plate;

wrapping the flexible elongate strap around the elongate item;

forming the flexible elongate strap as a separate mass of material from the top plate, such that the support is formed of at least two separate structures in the form of the top plate and the flexible elongate strap;

integrally forming a clasp with the flexible elongate strap, the clasp located at the first end of the flexible elongate strap;

releasably securing the elongate strap to the clasp with the strap holding the elongate item against the front edge of the top plate;

forming the top plate, to include at least one supporting passageway, the supporting passageway sized to allow the free end of the flexible elongate strap to be routed therethrough; and forming the front edge to be at least partially arcuate in a concave fashion.

9. The method of claim 8 including the further steps of:

releasing the flexible elongate strap from the clasp with the flexible elongate strap no longer holding the elongate item against the front edge of the top plate; and removing the top plate from the top edge of the form board such that the entire support is removed from the form board and the elongate item, with the support ready for reuse.

10. The method of claim 9 including the further step of repeating said fastening step at a new location.

11. The method of claim 9 wherein said releasing step includes the step of disengaging the flexible elongate strap from the clasp.

12. The method of claim 8 including the further step of forming the at least partially arcuate portions of the front edge to curve around an elongate conduit axis along which the conduit is adapted to be routed when the conduit is adjacent the front edge, the elongate conduit axis formed to be substantially perpendicular to the top plate.

* * * * *